US006379825B1

United States Patent
Goelff et al.

(10) Patent No.: US 6,379,825 B1
(45) Date of Patent: Apr. 30, 2002

(54) TRANSPARENT HEAT-SWELLABLE MATERIAL

(75) Inventors: Pierre Goelff, Nalinnes; Etienne Degand, Wezembeek-Oppem, both of (BE)

(73) Assignee: Glaverbel, S.A., Brussels (BE)

(*) Notice: Subject to any disclaimer, the term of this patent is extended or adjusted under 35 U.S.C. 154(b) by 0 days.

(21) Appl. No.: 09/529,641

(22) PCT Filed: Oct. 5, 1998

(86) PCT No.: PCT/BE98/00146

§ 371 Date: Jul. 10, 2000

§ 102(e) Date: Jul. 10, 2000

(87) PCT Pub. No.: WO99/19421

PCT Pub. Date: Apr. 22, 1999

(30) Foreign Application Priority Data

Oct. 15, 1997 (GB) ............................................. 9721812

(51) Int. Cl.[7] ................................................. B27N 9/00
(52) U.S. Cl. .................... 428/920; 428/332; 428/336; 428/428; 428/437; 428/438; 428/688; 428/913; 428/921
(58) Field of Search ................................ 428/332, 336, 428/428, 688, 437, 438, 913, 920, 921

(56) References Cited

U.S. PATENT DOCUMENTS 4,190,698 A 2/1980 De Boel et al. ............ 428/334
4,720,414 A 1/1988 Burga ......................... 428/141
4,873,146 A 10/1989 Toussaint et al. ........... 428/428

FOREIGN PATENT DOCUMENTS

| EP | 0705685 A1 | 4/1996 | ........... B32B/17/10 |
| GB | 1590837 | 6/1981 | ........... B32B/17/06 |
| GB | 2258422 B | 2/1993 | ........... B32B/17/06 |
| WO | 94/04355 | 3/1994 | ........... B32B/17/10 |

OTHER PUBLICATIONS

Satoshi, T., JP 58/120,548, Jul. 18, 1983, *Patent Abstract of Japan*, vol. 007, No. 225 (C–189), Oct. 6, 1983.

Primary Examiner—Deborah Jones
Assistant Examiner—Andrew T Piziali
(74) Attorney, Agent, or Firm—Piper Marbury Rudnick & Wolfe, LLP; Jerold I. Schneider

(57) ABSTRACT

A transparent heat-swellable material, a method for its preparation and fire-resistant glazing panels in which it is incorporated, are provided by a mixture of hydrated alkali metal silicate and an additive selected from polyalcohols and mono-or polysaccharides, in which the additive content is in the range of 5 to 22% by weight, the water content is in the range of 12 to 19.5% by weight, and the hydrated alkali metal silicate has a silicon oxide ($SiO_2$): alkali metal oxide molar ratio greater than 3.3 to 1. Glazing panels including the said material offer thermal insulation of greater than 30 minutes, a barrier to flames and fumes for greater than 90 minutes and thermal radiation of less than 10 $kW/m^2$, or even of less than 6 $kW/m^2$, after 90 minutes.

34 Claims, No Drawings

TRANSPARENT HEAT-SWELLABLE MATERIAL

BACKGROUND OF THE INVENTION

1. Field of the Invention

This Invention relates to a transparent heat-swellable material and to a fire-resistant glazing panel having multiple layers of glazing material with the said heat-swellable material bonded thereto.

2. Description of the Related Art

The general requirements for a fire-resistant panel are to provide an effective barrier against fumes and fumes and to provide thermal insulation. When all other parameters are constant, the extent of the fire resistance may depend on the type and size of glazing, the type of materials used in its construction and the manner in which it is held in a surrounding frame in an aperture. While glass is non-combustible it may itself soften or break under intense heat from a fire, or its frame may burn or distort, such that the barrier fails and direct fire propagation or escape of fumes can occur.

The use of a transparent heat-swellable material between layers of glazing material to improve the fire-resistant properties of glazing panels is well established to enhance the resistance of the panel both to heating in general and to exposure to fire in particular. The panel is formed as a laminate with a layer or layers of the transparent heat-swellable material each sandwiched between two transparent structural plies, usually thin glass sheets.

GB patent 1590837 teaches the use of an inturnescent material sandwiched between two structural plies in a laminated fire screening panel. It describes the use of hydrated metal salts as the inturnescent material especially hydrated alkali metal silicates such as hydrated sodium silicate. Later proposals have been concerned with modifying the silicate to improve its fire-resisting properties. For example WO94/04355 describes and claims a protective layer comprising a cured polysilicate prepared from an alkali metal silicate and a curing agent. EP-A-0705685 relates to a fire-resistant glazing panel comprising at least two glass sheets and an intermediate layer mainly composed of sodium water glass (sodium silicate) and water, together with hydrated potassium silicate and a small proportion of polyalcohols or sugars.

During the course of a fire, the silicate material slowly swells as the temperature increases, the water of hydration is driven off by the heat of the fire, and the material is converted to a foam which serves as a barrier to both radiated and conducted heat and may also preserve the ability to bond together structural sheets of the panel such as sheets of glass which may become shattered by the fire.

Panels are typically graded according to the length of time of heating under defined conditions until failure occurs in respect of such properties as insulation and integrity In the initial period of a fire, up to about 30 minutes, the panel should provide a high level of thermal insulation in order to facilitate the escape or if necessary the rescue of people in the affected area. This period is normally sufficient to permit the safe exit of everyone other than the fire-fighters who remain to control and extinguish the fire. The panel should also have sufficient integrity to provide a barrier to flame and fumes and a restraint to radiation of heat for at least the first 30 minutes and preferably for at least 60 minutes. With increasing emphasis on safety provisions in the home and at the workplace there is an increasing demand for panels to offer longer periods both of integrity, for example of 90 minutes or more, and of low radiation. Such longer periods are seen as important in seeking to provide sufficient time for fire-fighters to remain in a building and to control and extinguish the fire with minimum loss and damage to the affected property.

The fire-resistance of glazing panels is tested by mounting them in a wall of a furnace whose interior temperature is then increased according to a pre-determined schedule. Such a test is specified in International Standard ISO 834-1975 and is also described in International Standard ISO 9051-1990 which speaks specifically of the fire-resistance requirements for glazed assemblies, Similar European standards are proposed, including draft standard prEN1363 (document CEN/TC127 N 1095) and draft standard prEN1364 (document CEN/TC127 N 1085).

Draft standard prEN1363 includes a "Cotton wool pad" test and a "Gap gauge" test. In the former a cotton wool pad in a frame is placed for a maximum of 30 seconds adjacent to an area of a test glazing specimen under examination for failure of integrity. The time and location at which any ignition of the pad occurs are recorded. In the latter a 6 mm gap gauge and a 25 mm gap gauge are in turn applied without undue force to determine (a) whether the 6 mm gauge can be passed through a gap in the specimen into the furnace and moved 150 mm along the gap and (b) whether the 25 mm gauge can be passed through a gap in the specimen into the furnace.

It is an objective of the present invention to provide a transparent heat-swellable material which offers for fire-resistant glazing panels a period of heat insulation and an extended period of fire-resistance, especially in terms of its "integrity", i.e. providing a barrier to flame and fumes, and of restrained radiation of heat. These features should moreover be provided without making the panel cumbersome and heavy.

SUMMARY OF THE INVENTION

According to this invention, there is provided a transparent heat-swellable material comprising hydrated alkali metal silicate and at least one additive selected from polyalcohols and mono- or polysaccharides, characterised in that the additive content is in the range 5 to 22% by weight, the water content is in the range 12 to 19.5% by weight, and the hydrated alkali metal silicate has a silicon oxide ($SiO_2$) :alkali metal oxide molar ratio greater than 3.3 to 1.

The invention further includes within its scope a sheet of transparent vitreous material carrying a layer of the above-defined heat-swellable material, and a fire-resistant panel comprising one or more layers of the said heat-swellable material and a corresponding two or more sheets of transparent vitreous material.

The term "heat-swellable" used herein refers to materials, otherwise known as inturnescent materials, with the properties, when exposed to a flame, of swelling and forming an insulating barrier to propagation of the flame.

The heat-swellable silicate materials of the invention offer considerable improvements in the thermal insulation, integrity (barrier to flame and fumes), and thermal radiation of glazing panels formed from them. The reasons for these improvements are not entirely clear but probably result from the combination of the claimed additive and an unusually low proportion of water. Another important factor appears to be that the silicates with a $SiO_2$:alkali oxide molar ratio of greater than 3.3:1 expand less during standard fire tests than known materials obtained by drying alkaline silicate sols with a molar ratio of up to 3.3:1. The reduction in thermal radiation appears to result in part from the good integrity of the panel and the very low rates of flow of the foams arising from heat-swellable material according to the invention upon their exposure to fire.

The improvements are especially surprising in the case of soda-lime glass sheets which are commonly used in laminated glazing since the transformation temperature of the glass remains very largely below the temperatures reached during the fire tests; the transformation temperature of the foams in themselves is again largely less than that of the soda-lime glass.

The preferred alkali metal silicate is sodium silicate with a $SiO_2:Na_2O$ molar ratio of about 4:1. A combination of this preferred silicate with a silicate having a lower $SiO_2:Na_2O$ molar ratio, such as 3.3:1, also provides a panel with beneficial fire-resistant properties, provided that the total $SiO_2:Na_2O$ molar ratio is greater than 3.3:1.

Preferred examples of the additive are glycerol ethylene glycol and saccharose. It is typically to be employed in an amount of 5 to 21% by weight of the transparent heat-swellable material. Glycerol is the most preferred additive. It is preferably employed in an amount of 10 to 16% by weight of the transparent heat-swellable material.

The water content of the said material should be in the range 12 to 19.5 %, typically 12 to 19 %, by weight. The preferred range is 15 to 19.5% by weight.

In one preferred embodiment the invention provides a transparent heat-swellable material comprising hydrated sodium silicate and glycerol, characterised in that the glycerol content is in the range 5 to 20% by weight, the water content is in the range 14 to 19% by weight, and the hydrated sodium silicate has a silicon oxide ($SiO_2$):sodium oxide ($Na_2O$) molar ratio greater than 3.3 to 1.

The panels according to the invention preferably include at least two layers of the said material and at least three layers of transparent vitreous material. A particularly preferred panel configuration comprises three layers of the said material and four layers of the transparent vitreous material.

As mentioned above, the transparent vitreous material is most typically soda-lime float glass and the present invention is primarily described with reference thereto. Other types of vitreous material for example borosilicate or aluminosilicate glass or of vitro-ceramic material, may however be employed for particular purposes, such as low expansion glass, extra-clear glass, hardened, armoured or coated glass. Usual plastics materials tend to be unsuitable for fire-resistant panels since they may ignite and may generate toxic fumes.

Panels according to the invention may be incorporated in double glazing and/or associated with polymer sheets or films. They may include a combination of thin and thick sheets of the transparent vitreous material. A thickness of less than 5 mm is preferred for each sheet of vitreous material in order to provide a panel which is thin, light and easy to install into a window or door frame.

The transparent heat-swellable material of the invention is preferably formed from a starting solution of hydrated alkali metal silicate and an additive. Care should be taken when preparing the starting solution to avoid agitation which would cause air or other gas to dissolve since these could reappear as microbubbles at a later stage. The solution is then partially dried to form a viscous material, known as a "solid gel".

Thus the present invention further provides a method for the preparation of a transparent heat-swellable material from a starting solution of hydrated alkali metal silicate and at least one additive characterised in that the hydrated alkali metal silicate has a silicon oxide ($SiO_2$):alkali metal oxide molar ratio of greater than 3.3 to 1, the additive is selected from polyalcohols and mono- or polysaccharides, and the solution is partially dried to form a solid gel having a content in the range 5 to 22% by weight, and a water content in the range 12 to 19.5% by weight.

In a preferred embodiment of the method of the present invention the starting solution is dried in such a way that the silicate product is in the form of grains. To form a glazing panel from this preferred granular form of the material, the grains are evenly distributed as a layer on a surface of a vitreous sheet. A second vitreous sheet is then placed on the grains, followed by further grain layers and sheets if required.

The maximum dimension of the grains is preferably in the range 10 to 700 μm, most preferably in the range 150 to 500 μm. These sizes facilitate formation of the grains into a compact layer with good optical and fire-resistance properties. Their beneficial effect on the behavior of the silicate layer during the course of a fire may possibly be the result of their achieving a fine and uniform foam structure when subjected to the intense heat of the fire.

Instead of converting the starting solution to granular form before application to the vitreous sheet, the solution can be applied directly to the sheet and then dried in situ thereon. The starring solution is highly viscous and its viscosity is increased by the drying, thereby assisting in keeping it in place.

The so-assembled panel is subjected to heat and pressure conditions to cause the silicate layer, whether formed from grains or directly from the solution, to bond to the respective adjacent surfaces of the vitreous sheets. The temperature for this stage is preferably at least 80° C. and the applied internal pressure initially less than 30 kPa, as described in GB patent specification 2258422. In the case of a granular layer, the heat and pressure convert the grains into a continuous layer in which individual grains are not visible to the naked eye: the layer presents a uniform transparent appearance.

The heat and pressure also serve to degas the silicate product, thereby preventing the occurrence of visible gas micro-bubbles at or near the surface of the applied layer, which would otherwise adversely affect the optical properties of the layer and thus of the panel.

The panel is then subjected to further heating and pressure, typically in an autoclave, to complete the bonding.

To avoid bonding to the resulting silicate layer of any moulding plate used to compact the granular layer during assembly of a panel, the plate may be treated in an appropriate manner, for example with a silicone. In one convenient embodiment of the invention the moulding plate is constituted by, or faced with, a sheet which is to become incorporated into the panel and to which the silicate layer becomes bonded. The or each silicate layer may thus be sandwiched between two sheets of the panel which is simultaneously formed into a laminate by the heat and pressure treatment employed for the bonding. Indeed the whole panel may be assembled and formed into a laminate by that treatment.

The thickness of the or each layer of silicate material is preferably is in the range 0.1 to 5.0 mm. While layers as thin as 0.1 mm can give adequate short-term protection against fire, better protection is afforded by thicker layers. In general, increasing the thickness of such a layer beyond 5 mm does not give a commensurate increase in the degree of protection afforded and creates difficulties in achieving good optical properties.

In one embodiment of the invention the starting material includes an anti-ageing agent in an amount of up to 2% by weight. Preferably the anti-ageing agent is a quaternary ammonium compound, most preferably tetramethyl ammonium hydroxide (TMAH). The anti-ageing agent retards the ageing properties of the heat-swellable material which tend to occur as deterioration of the optical properties of the panel, for example a reduction in the transparency of the silicate.

The invention the offers fire-resistant panels having for example the following advantageous features in regard to the standards required of such panels:

a small (less than 20 mm) total panel thickness;

thermal insulation of greater than 30 minutes;

integrity (barrier to flames and fumes) of greater than 90 minutes; and a ratio of integrity to thermal insulation of more than 2;

thermal radiation of less than 10 kW/m$^2$, or even of less than 6 kW/m$^2$, after 90 minutes.

The combination of thermal insulation of greater than 30 minutes and thermal radiation of less than 10 kW/m$^2$ after 90 minutes is a particularly advantageous feature of the invention.

DESCRIPTION OF THE PREFERRED EMBODIMENTS

The invention is further described in the following non-limiting examples.

EXAMPLE 1

The starting materials for the example were sodium silicate solution, glycerol and tetramethyl ammonium hydroxide (25% aqueous solution). The silicate had a dry sodium silicate content of 28.9% by weight and a density of 1.276 at 20° C. Its silicon oxide;sodium oxide molar ratio was 4.04. The glycerol was of 99% purity.

To 100 liters of the silicate solution were added 7 liters of the glycerol and 3 liters of the TMAH solution, forming 110 liters of a silicate starting solution. The so-formed starting solution was partially dehydrated on a drum dryer, yielding a fine granular powder with a glycerol content of about 15.6% by weight a water content of about 17.0% by weight, a TMAH content of 1.3% by weight and a particle size of less than 700 μm.

A laminated transparent glazing panel with an alternate succession of 4 sheets of soda-lime float glass and of 3 layers of transparent silicate was formed from the silicate grains and sheets of soda-lime float glass of 3 mm thickness and measuring 1.5×2.8 m. The glass sheets were first cleaned in a washing machine and dried. Powder was then deposited on a horizontally disposed glass sheet to a uniform thickness and in an amount of 2.2 kg/m$^2$. A second glass sheet was then placed on the deposited grains. Further grains were deposited on the second glass sheet again uniformly in an amount of 2.2 kg/m$^2$. Third and fourth glass sheets were similarly added, with similar intervening grains deposited uniformly in an amount of 2.2 kg/m$^2$. The so-formed multi-ply panel assembly of sheets and silicate layers was compacted under reduced pressure of about 13 kPa (absolute) while Its temperature was slowly raised from ambient (20° C.) to about 100° C. The pressure was allowed to return to atmospheric and the panel was then placed for 3 hours in an autoclave heated to 130° C. and submitted to a pressure of 13000 hPa. thereby completing the bonding.

Each silicate layer in the finished panel had a thickness of 1.2 mm and the total thickness of the panel was 15.6 mm. The finished panel was cut to dimensions of 1.0 m×2.0 m, with samples of 200 mm×200 mm being also taken.

Two similar panels measuring 1.0 m×2.0 m were mounted in a frame as described in French patent specification 2593223. The frame was itself held within a masonry surround measuring 3.0×3.0 m. The masonry surround was then fitted into a corresponding opening in the wall of a gas furnace. The ambient temperature was 15° C. The furnace was heated according to the heating curve defined in the draft standard prEN 1363. The panel was subjected to standard tests for thermal insulation (mean and local, according to draft standard prEN 1364), integrity (using both the "cotton wool pad" test and the "gap gauge" tests of draft standard prEN1363) and for the thermal radiation emitted after 90 minutes at 1 metre from the centre of the panel along a normal thereto, using a heat flux transducer (Medtherm Corporation Series 64). The results are shown in the accompanying table.

Two of the 200 mm×200 mm samples were placed for 30 days in a thermal chamber held at 80° C. Their optical qualities remained substantially unchanged, with haze remaining below 1%.

EXAMPLE 2

The procedure of Example 1 was repeated, except for changes in the composition of the silicate starting solution and for the use of a larger panel (1.2 m×2.7 m). The staring solution was formed of 100 liters of silicate and 9 liters of glycerol. It was employed to form a silicate layer of 1.2 mm thickness. The contents of glycerol and water in the layer material were respectively 19.8% and 15.1% by weight.

The resulting panel had a thickness of 15.6 mm. It was subjected to the above-described standard tests for thermal insulation, integrity and thermal radiation. The results are shown in the accompanying table.

The panel was placed in a chamber heated to 80° C. and kept therein for 21 days. Its optical qualities remained substantially unchanged, with haze remaining below 1%.

EXAMPLES 3 and 4

The procedure of Example 1 was again adopted, except that the starting solution was formed of 100 liters of silicate, 5 liters of glycerol and 3 liters of TMAH solution and that the silicate with a silicon oxide:sodium oxide, molar ratio of 4.04 was partially substituted (50% in Example 3, 25% in Example 4) by silicate with a silicon oxide:sodium oxide molar ratio of 3.3. The partially dehydrated product had contents of water, glycerol and TMAH of respectively 17.8%, 11.1% and 1.3% by weight in Example 3, and 17.2%, 11.7% and 1.4% by weight in Example 4. The panels (measuring 1.0 m×2.0 m) were formed from three glass sheets and two silicate layers. They were subjected to the standard tests as the previous Examples. The results are shown in the accompanying table.

EXAMPLE 5

In a variation of Example 1, a panel was formed according to the general procedure described therein but with an additional glass sheet and an additional layer of silicate, making a total of 5 glass sheets and 4 silicate layers. The glass sheets each had an area of 1.2×2.7 meters and a thickness of 2.5 mm. The silicate again had a silicon oxide:sodium oxide molar ratio of 4.04. The silicate starting solution was formed of 100 lures of silicate, 7 liters of glycerol and 3 liters of TMAH solution, giving contents of water, glycerol and TMAH in the farmed layer of 17.0%, 15.6% and 1.3% by weight.

The resulting panel had a thickness of 17.3 mm. It was subjected to the standard tests as in the previous Examples. The results are shown in the accompanying table.

EXAMPLE 6

In a further variation of Example 1, the starting solution was formed of 100 liters of silicate ($SiO_2$:$Na_2O$ 4.04:1), 7 liters of glycerol and 0.4 liters of TMAM solution giving contents of water, glycerol and TMAH in the formed layer of 16.8%, 15.9% and 0.2% by weight.

The formed panel had 4 sheets of soda-lime float glass of 3.2 mm thickness and 3 layers of the transparent silicate. It measured 1.2×2.7 m and had a total thickness of 16.4 mm. It was subjected to the standard tests as in the previous Examples and the results are shown in the accompanying table.

EXAMPLE 7

In this example the starting materials were potassium silicate, glycerol, tetramethyl ammonium hydroxide (25% aqueous solution) and saccharose (800 g/l solution). The silicate had a dry potassium silicate content of 29.6% by weight and a density of 1.2615 at 20° C. Its silicon oxide-:potassium oxide molar ratio was 4.07. The glycerol was of 99% purity.

To 68.9 liters of the silicate solution were added 8.1 liters of the glycerol, 2.08 liters of the TMAH solution, and 0.7 liters of the saccharose solution. Part of the so-formed solution was applied as a coating of uniform thickness to two horizontally disposed sheets of soda-lime float glass each measuring 1.0 m×2.0 m and having a thickness of 2.85 mm. The amount of the solution applied to the glass was 3.3 l/m². The so-coated sheets were placed in a heated chamber with a relative humidity of 85% in which the temperature was progressively raised to 90° C. to effect partial dehydration of the coating and were then laminated with a third sheet of soda-lime float glass to form a glazing panel having a total thickness of 10.95 mm The resultant silicate layers in the panel had a glycerol content of about 22.0% by weight, a water content of 19.2% by weight, a TMAH content of 1.1% by weight and a saccharose content of 1.2%.

The panel was subjected to the standard tests as in the previous examples. The results are shown in the accompanying table.

EXAMPLE 8

The procedure of Example 1 was repeated except that the starting solution was formed of 100 liters of sodium silicate. 8 liters of glycerol and 0.4 liters of TMAH The partially dehydrated product had contents of water, glycerol and TMAH of respectively about 16.0%, 17.9% and 0.2% by weight.

The resulting panel was formed from three sheets of borosilicate float glass measuring 1.2×2.0 m with a thickness of 3.3 mm. It was subjected to the standard tests as in the previous examples. The results are shown in the accompanying table.

EXAMPLE 9

The procedure of Example 1 was repeated except that the starting solution was formed of 90 liters of sodium silicate, 10 liters of potassium silicate (of the same composition as in Example 7), 7 liters of glycerol and 0.4 liters of TMAH. The partially dehydrated product had contents of water, glycerol and TMAH of respectively about 18.2%, 15.6% and 0.2% by weight.

The resulting panel was formed from four sheets of soda-lime float glass measuring 1.2×2.0 m with a thickness of 3.1 mm. It was subjected to the standard tests as in the previous examples. The results are shown in the accompanying table.

EXAMPLE 10

The procedure of Example 8 was repeated. The partially dehydrated product again had contents of water, glycerol and TMAH of respectively about 16.0%. 17.9% and 0.2% by weight. In this example however the glass employed for the three sheets of the panel had the following composition (by weight); $Al_2O_3$ 7.7%; $Na_2O+K_2O$ 9.9%; BaO+SrO+CaO+MgO 20%: ZrO2 2.5%; and $SiO_2$ 59%. The sheets had a thickness of 2.8 mm and the silicate layers had a thickness of 1.2 mm.

The panel, which measured 1.0×1.0 m, was subjected to the standard tests as in the previous examples. The results are shown In the accompanying table.

TABLE

| Ex. | % of 4.0 Si:Na silicate | Layer thickness (mm) | Thermal insulation | | Integrity | | Therm. radn. |
| | | | Mean (min) | Local (min) | Cotton (min) | Gap gauge (min) | after 90 min (kW/m²) |
| --- | --- | --- | --- | --- | --- | --- | --- |
| 1 | 100 | 1.2 | 33 | 37 | 105 | 115 | 5 |
| 2 | 100 | 1.2 | 36 | 43 | >105 | >105 | NM |
| 3 | 50 | 1.2 | 24 | 27 | 67 | >69 | 7[1] |
| 4 | 75 | 1.2 | 21 | 26 | 100 | 100 | 5[1] |
| 5 | 100 | 1.2 | 54 | 57 | 85 | >98 | NM |
| 6 | 100 | 1.2 | 39 | 42 | 78 | 95 | NM |
| 7 | 100[2] | 1.2 | 20 | 17 | 55 | 84 | NM |
| 8 | 100 | 1.3 | 23 | 25 | 147 | 150 | 6 |
| 9 | 90[3] | 1.2 | 33 | 35 | 51 | 92 | 7 |
| 10 | 100 | 1.2 | 22 | 23 | NM | 162 | 6 |

NM = not measured
[1] = measured at 60 minutes
[2] = 100% potassium silicate
[3] = 90% sodium silicate + 10% potassium silicate.

What is claimed is:

1. A transparent, heat-swellable material, comprising:
   from 12 to 19.5% by weight of water;
   hydrated alkali metal silicate having a molar ratio of silicon oxide ($SiO_2$) to alkali metal oxide which is greater than 3.3 to 1; and
   from 5 to 22% by weight of at least one additive selected from the group consisting of polyalcohols, monosaccharides, and polysaccharides.

2. The transparent, heat-swellable material as claimed in claim 1, wherein the hydrated alkali metal silicate is sodium silicate.

3. The transparent, heat-swellable material as claimed in claim 2, wherein the sodium silicate has a molar ratio of $SiO_2:Na_2O$ of about 4:1.

4. The transparent, heat-swellable material as claimed in claims 1, wherein the hydrated alkali metal silicate comprises hydrated sodium silicate having a $SiO_2:(Na_2O)$ molar ratio of about 4:1 and hydrated sodium silicate having a $SiO_2:Na_2O$ molar ratio ranging from 3.3:1 to 4:1."

5. The transparent, heat-swellable material as claimed in claim 1, wherein the at least one additive is present in an amount ranging from 5 to 21% by weight.

6. The transparent, heat-swellable material as claimed in claim 1, wherein the at least one additive is glycerol.

7. The transparent, heat-swellable material as claimed in claim 6, wherein the glycerol is present in an amount ranging from 10 to 16% by weight.

8. The transparent, heat-swellable material as claimed in claim 1, wherein the water is present in an amount ranging from 12 to 19% by weight.

9. The transparent, heat-swellable material as claimed in claim 1, wherein the water is present in an amount ranging from 15 to 19.5% by weight.

10. The transparent, heat-swellable material as claimed in claim 1, further comprising up to 2% by weight of an anti-aging agent.

11. The transparent, heat-swellable material as claimed in claim 10, wherein the anti-aging agent is tetramethyl ammonium hydroxide (TMAH).

12. A transparent, aqueous, heat-swellable material, comprising:
    from 14 to 19% by weight of water;
    hydrated sodium silicate having a molar ratio of silicon oxide ($SiO_2$) to sodium oxide ($Na_2O$) which is greater than 3.3 to 1; and
    from 5 to 20% by weight of glycerol.

13. A method for the preparation of a transparent, heat-swellable material, comprising:
    providing a starting solution comprised of:
       water;
       hydrated alkali metal silicate having a molar ratio of silicon oxide ($SiO_2$) to alkali metal oxide of greater than 3.3 to 1; and
       at least one additive selected from the group consisting of polyalcohols, monosaccharides, and polysaccharides; and
    partially drying the starting solution to form a solid gel having a content of the at least one additive ranging from 5 to 22% by weight and a content of the water ranging from 12 to 19.5% by weight.

14. The method as claimed in claim 13, wherein the starting solution is dried in such a way as to form grains.

15. The method as claimed in claim 14, wherein the grains have a maximum dimension which ranges from 10 to 700 μm.

16. The method as claimed in claim 15, wherein the grains have a maximum dimension which ranges from 150 to 500 μm.

17. A method of forming a transparent glazing panel from a solid gel prepared according to claim 14, comprising:
    providing a transparent vitreous sheet;
    evenly distributing the solid gel on a surface of the transparent vitreous sheet to provide a layer thereon; and
    bonding the layer to the transparent vitreous sheet by subjecting the layer to heat and pressure.

18. The method as claimed in claim 17, wherein bonding is effected at a temperature of at least 80° C.

19. The method as claimed in claim 17, wherein two vitreous sheets are provided, and wherein solid gel is distributed on a surface of at least one of the two vitreous sheets to provide at least one layer, the method further comprising sandwiching the at least one layer between the two vitreous sheets to form a laminate, which laminate is laminated during bonding by subjecting the at least one layer to heat and pressure.

20. A method of forming a transparent glazing panel from grains of the material according to claim 13, comprising:
    providing a transparent vitreous sheet; evenly distributing the grains on a surface of the vitreous sheet to provide a layer thereon; and
    bonding the layer to the vitreous sheet by subjecting the layer to heat and pressure.

21. The method as claimed in claim 20, wherein bonding is effected at a temperature of at least 80° C.

22. The method as claimed in claim 20, wherein two transparent vitreous sheets are provided, and wherein grains are distributed on a surface of at least one of the two transparent vitreous sheets to provide at least one layer, the method further comprising sandwiching the at least one layer between the two transparent vitreous sheets to form a laminate, which laminate is laminated during bonding by subjecting the at least one layer to heat and pressure.

23. A sheet of transparent vitreous material carrying a layer of material as claimed in claim 1.

24. A fire-resistant panel, comprising:
    at least one layer of material as claimed in claim 1 and a corresponding at least two transparent vitreous sheets.

25. The fire-resistant panel as claimed in claim 24, wherein the fire-resistant panel comprises three layers of material and four transparent vitreous sheets.

26. The fire-resistant panel as claimed in claim 24, wherein the at least one transparent vitreous sheet has a thickness of less than 5 mm.

27. The fire-resistant panel as claimed in claim 24, wherein each of the at least one layer of material has a thickness ranging from 0.1 to 5.0 mm.

28. The fire-resistant panel as claimed in claim 24, wherein the fire-resistant panel has a thickness of less than 20 mm.

29. The fire-resistant panel as claimed in claim 24, wherein the fire-resistant panel has a thermal insulation of greater than 30 minutes when exposed to fire.

30. The fire-resistant panel as claimed in claim 24, wherein the fire-resistant panel provides an integrity of greater than 90 minutes when exposed to fire.

31. The fire-resistant panel as claimed in claim 24, wherein the fire-resistant panel has a ratio of integrity to thermal insulation of more than 2.

32. The fire-resistant panel as claimed in claim 24, wherein the fire-resistant panel has thermal radiation when exposed to fire of less than 10 kW/m$^2$ after 90 minutes.

33. The fire-resistant panel as claimed in claim 32, wherein the fire-resistant panel has thermal radiation when exposed to fire of less than 6 kW/m$^2$ after 90 minutes.

34. The fire-resistant panel as claimed in claim 24, wherein the fire-resistant panel has, when exposed to fire, a combination of thermal insulation of greater than 30 minutes and thermal radiation of less than 10 kW/m$^2$ after 90 minutes.

* * * * *